US012607343B1

(12) United States Patent
Hu

(10) Patent No.: US 12,607,343 B1
(45) Date of Patent: Apr. 21, 2026

(54) EAVES LAMP AND MANUFACTURING METHOD THEREOF

(71) Applicant: Xiaoyan Hu, Yangjiang City (CN)

(72) Inventor: Xiaoyan Hu, Yangjiang City (CN)

(*) Notice: Subject to any disclaimer, the term of this patent is extended or adjusted under 35 U.S.C. 154(b) by 0 days.

(21) Appl. No.: 19/293,072

(22) Filed: Aug. 7, 2025

(51) Int. Cl.

| | |
|---|---|
| ***F21V 31/00*** | (2006.01) |
| ***F21S 4/10*** | (2016.01) |
| ***F21V 5/04*** | (2006.01) |
| ***F21V 15/01*** | (2006.01) |
| ***F21V 23/00*** | (2015.01) |
| ***F21V 23/06*** | (2006.01) |

(52) U.S. Cl.
CPC .............. *F21V 31/005* (2013.01); *F21S 4/10* (2016.01); *F21V 5/041* (2013.01); *F21V 15/01* (2013.01); *F21V 23/002* (2013.01); *F21V 23/06* (2013.01)

(58) Field of Classification Search
CPC .. F21S 4/10; F21V 5/041; F21V 15/01; F21V 23/002; F21V 23/06; F21V 31/005
See application file for complete search history.

(56) References Cited

U.S. PATENT DOCUMENTS

| | | | | |
|---|---|---|---|---|
| 11,549,667 B1 | 1/2023 | Liu et al. | | |
| 12,188,628 B1 * | 1/2025 | Liu | ....................... | F21V 17/164 |
| 12,392,484 B1 * | 8/2025 | Tang | ..................... | F21V 23/002 |

FOREIGN PATENT DOCUMENTS

| | | |
|---|---|---|
| CN | 206018299 U | 3/2017 |
| CN | 209213804 U | 8/2019 |
| CN | 222392852 U | 1/2025 |

* cited by examiner

*Primary Examiner* — Gerald J Sufleta, II

(57) ABSTRACT

Provided is an eaves lamp. The eaves lamp includes a shell and a light-emitting assembly, wherein the shell is formed by closing an upper shell and a lower shell to form an accommodating cavity, at least two wire pressing grooves are arranged on each of the upper shell and the lower shell, a squeezing boss is formed between adjacent wire pressing grooves, a spacing is defined between a squeezing boss corresponding to the upper shell and a squeezing boss corresponding to the lower shell, the light-emitting assembly includes a light board arranged in the shell and a flat cable electrically connected to the light board, the flat cable includes at least two parallel wires and a connecting part between the two wires, and the wires pass through the wire pressing grooves and are clamped and fixed by the wire pressing grooves of the upper shell and the lower shell.

19 Claims, 4 Drawing Sheets

EAVES LAMP AND MANUFACTURING METHOD THEREOF

TECHNICAL FIELD

The present invention relates to the technical field of eaves lamps, and in particular, to an eaves lamp and a manufacturing method thereof.

BACKGROUND

Eaves lamps are exposed to outdoor environment for a long time and are affected by various factors such as rain, dew, and humid air. In a case that the waterproof performance is insufficient, moisture may easily penetrate into an interior of a lamp body, which affects the service life and normal operation stability of the eaves lamps.

In the related prior art, such as Patent Application No. U.S. Ser. No. 12/276,416B1 originally published by the inventor, an eaves lamp structure is disclosed. To ensure the waterproof performance of the eaves lamp structure, an elastic strip is added to abut against an electric wire, so as to ensure the sealing performance of the eaves lamp structure. However, due to small size of components, an operator struggles to accurately and efficiently perform mounting operation in an assembly process; consequently, the production and assembly efficiency is reduced, and the production cost is increased. Furthermore, small components are prone to misalignment and loose connections during assembly, which may negatively impact the overall structural stability and performance of an eaves lamp, making it unable to meet the high-performance requirements of the eaves lamp in practical applications.

Therefore, in view of the problems of poor waterproof performance of existing eaves lamps and inconvenience in assembly in the related prior art, it is necessary to develop a novel eaves lamp structure to solve the foregoing technical defects and improve the comprehensive performance of eaves lamps.

SUMMARY

A primary objective of the present invention is to provide an eaves lamp, which aims to improve the practicality of the eaves lamp.

To achieve the foregoing objective, the eaves lamp provided by the present invention includes:

a shell, wherein the shell includes an upper shell and a lower shell closed to form an accommodating cavity, at least two wire pressing grooves are arranged on each of the upper shell and the lower shell, a squeezing boss is formed between adjacent wire pressing grooves, and a spacing is defined between a squeezing boss of the upper shell and a squeezing boss of the lower shell;

a light-emitting assembly, wherein the light-emitting assembly includes a light board and a flat cable electrically connected to the light board, the light board is arranged in the accommodating cavity, the flat cable includes at least two wires connected in parallel, a connecting part is arranged between the two wires, the wires pass through the wire pressing grooves, and the connecting part is positioned in the spacing; when the upper shell and the lower shell are closed, the wire pressing grooves and the squeezing boss squeeze the flat cable, the flat cable is in interference fit with the shell, and a cross-sectional area of the flat cable at two ends of a squeezed position is larger than a cross-sectional area of the wire pressing grooves, thereby sealing the wire pressing grooves.

The present invention further provides a manufacturing method of an eaves lamp, wherein the eaves lamp includes a shell and a light-emitting assembly, the shell includes an upper shell and a lower shell, the upper shell is provided with a light-focusing area protruding outward, the lower shell is provided with a close-fit column, and the upper shell is provided with a positioning groove;

the manufacturing method includes the following steps:

S1: separately designing a mold cavity of the upper shell and a mold cavity of the lower shell, wherein a portion of the mold cavity corresponding to the light-focusing area is precisely machined and mirror-polished;

S2: injecting a molding material into the mold cavities to obtain the upper shell and the lower shell;

S3: mounting the light-emitting assembly on the lower shell, and securing the lower shell and the upper shell relative to each other through cooperation between the close-fit column and the positioning groove; and S4: performing ultrasonic welding on the upper shell and the lower shell to obtain the eaves lamp.

The present invention provides an eaves lamp. The eaves lamp includes a shell and a light-emitting assembly, wherein the shell is formed by closing an upper shell and a lower shell to form an accommodating cavity, at least two wire pressing grooves are arranged on each of the upper shell and the lower shell, a squeezing boss is formed between adjacent wire pressing grooves, a spacing is defined between a squeezing boss corresponding to the upper shell and a squeezing boss corresponding to the lower shell, the light-emitting assembly includes a light board arranged in the shell and a flat cable electrically connected to the light board, the flat cable includes at least two parallel wires and a connecting part between the two wires, the wires pass through the wire pressing grooves and are clamped and fixed by the wire pressing grooves of the upper shell and the lower shell, and the connecting part is positioned in the spacing and is jointly pressed by the squeezing bosses of the upper shell and the lower shell, so that the flat cable is in interference fit with the shell, and squeezing-induced extrusion at two sides is achieved. This structure achieves positioning and sealing of the flat cable by the shell body without relying on additional small sealing assemblies, which simplifies the assembly process, improves assembly efficiency, and effectively solves poor waterproof performance and complex assembly process in the existing eaves lamps, thereby enhancing the stability of the eaves lamps in outdoor environments and the reliability of the overall structure.

BRIEF DESCRIPTION OF THE DRAWINGS

To more clearly illustrate the technical solutions in the embodiments of the present invention or in the prior art, the drawings required to be used in the description of the embodiments or the prior art are briefly introduced below. It is clear that the drawings in the description below are some embodiments of the present invention, and those of ordinary skill in the art can obtain other drawings according to the structures illustrated in these drawings without creative efforts.

DESCRIPTIONS OF REFERENCE NUMERALS

Figure 1:
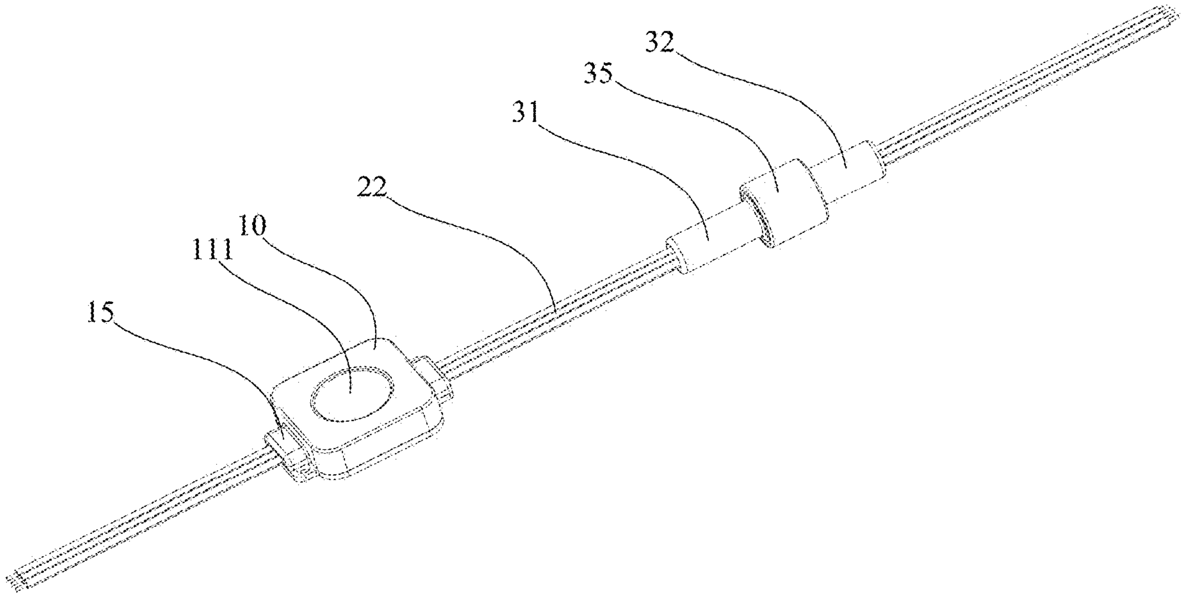
FIG. 1 is a schematic structural diagram of an embodiment of an eaves lamp according to the present invention.
Figure 2:
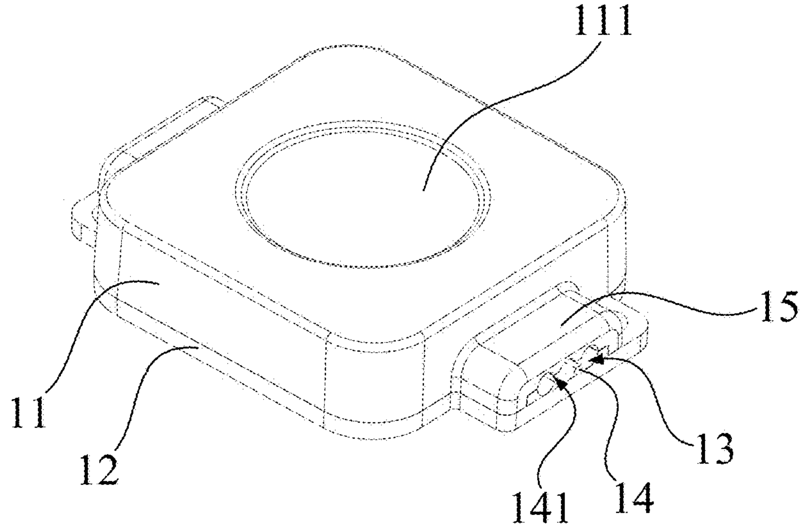
FIG. 2 is a schematic structural diagram of another embodiment of an eaves lamp according to the present invention.
Figure 3:
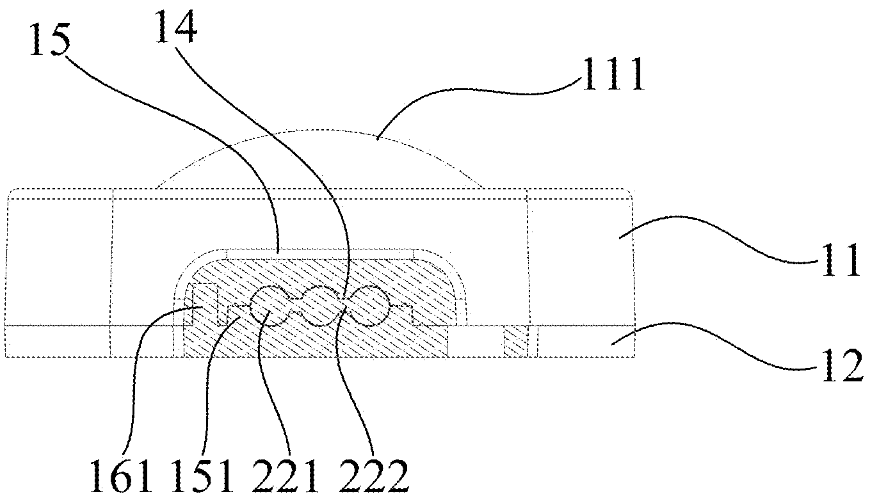
FIG. 3 is a schematic diagram of a cross-sectional structure of an eaves lamp according to the present invention at an angle.
Figure 4:
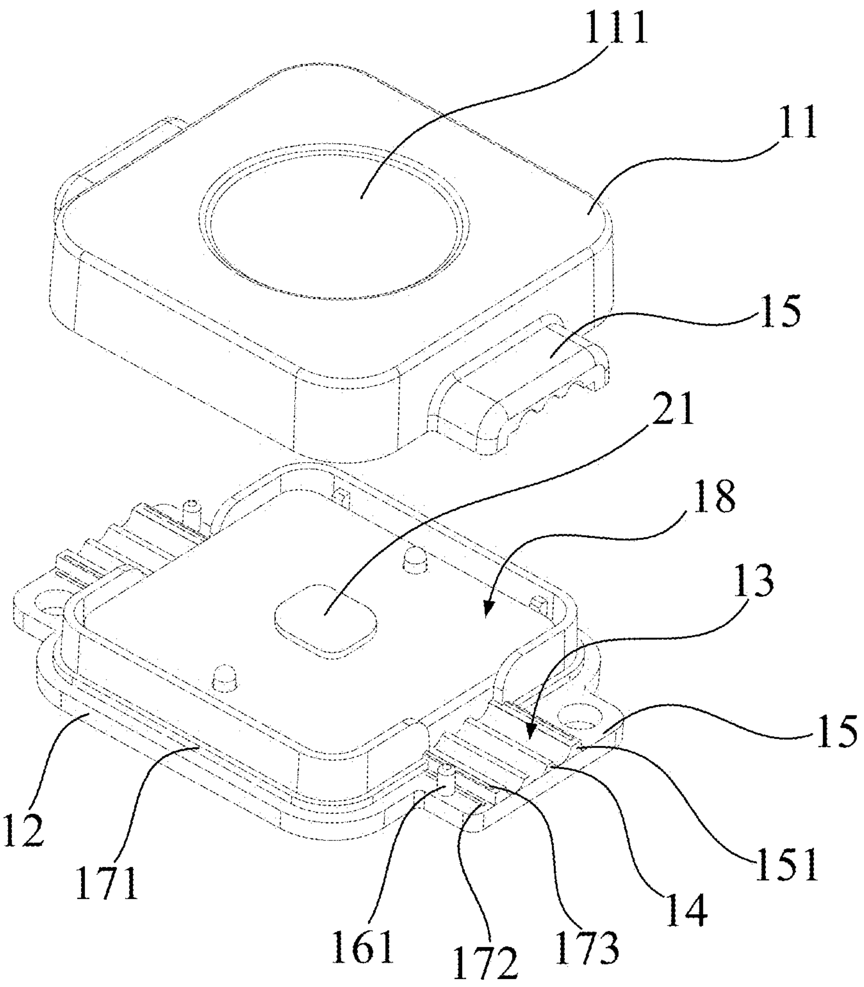
FIG. 4 is a schematic diagram of an exploded structure of an eaves lamp according to the present invention at an angle.
Figure 5:
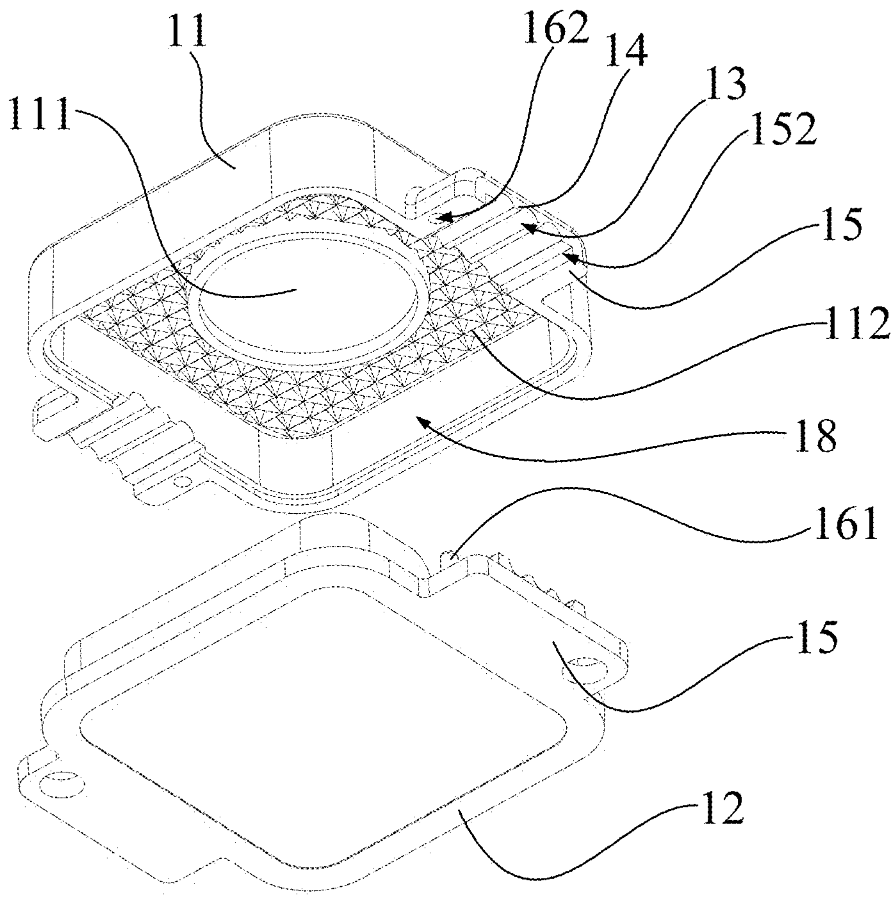
FIG. 5 is a schematic diagram of an exploded structure of an eaves lamp according to the present invention at another angle.

10. shell; 11. upper shell; 111. light-focusing area; 112. shielding area; 12. lower shell; 13. wire pressing groove; 14. squeezing boss; 141. spacing; 15. mounting seat; 151. mounting boss; 152. limiting groove; 161. close-fit column; 162. positioning groove; 171. first welding line; 172. second welding line; 173. third welding line; 18. accommodating cavity; 21. light board; 22. flat cable; 221. wire; 222. connecting part; 31. male connector; 32. female connector; 33. abutment ring; 34. seal ring; and 35. screw cap.

The realization of the objectives, the functional features, and the advantages of the present invention will be further explained in conjunction with the embodiments and with reference to the drawings.

DETAILED DESCRIPTION OF THE EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other; however, this combination must be based on that it can be implemented by those of ordinary skill in the art. When the combination of the technical solutions is contradictory or cannot be implemented, such a combination of the technical solutions should not be considered to exist, and is not within the protection scope of the present invention.

The present invention provides an eaves lamp.

In an embodiment of the present invention, as shown in FIGS. 1 to 5, the eaves lamp includes a shell 10 and a light-emitting assembly. The shell 10 is composed of an upper shell 11 and a lower shell 12, and the upper shell and the lower shell are closed to form an accommodating cavity 18 for accommodating the light-emitting assembly. At least two wire pressing grooves 13 are formed on each of the upper shell 11 and the lower shell 12, a squeezing boss 14 is arranged between adjacent wire pressing grooves 13 on the upper shell 11 or the lower shell 12, the squeezing bosses 14 of the upper shell 11 and the lower shell 12 are oppositely arranged, and a spacing 141 is defined between the squeezing bosses.

The light-emitting assembly includes a light board 21 arranged in the shell 10 and a flat cable 22 electrically connected to the light board 21. The flat cable 22 is composed of at least two parallel wires 221, the wires 221 are integrally connected to form a connecting part 222, the flat cable 22 passes through the wire pressing grooves 13 formed by cooperation between the upper shell 11 and the lower shell 12, the wires 221 are positioned in the wire pressing grooves 13 and are squeezed and fixed by the upper shell 11 and the lower shell 12, and the connecting part 222 of the flat cable 22 is positioned in the spacing 141 between the squeezing bosses 14 of the upper shell 11 and the lower shell 12 and is clamped by the squeezing bosses 14.

With this structural design, during assembly, an operator only aligns the flat cable 22 with the wire pressing grooves 13 and close the upper shell 11 and the lower shell 12, so that the flat cable 22 may be effectively positioned and clamped through the structures of the wire pressing grooves 13 and the squeezing bosses 14 on the shell 10. The wire pressing grooves 13 clamp the wires 221, so that the flat cable 22 is in interference fit with the shell 10, which prevents the flat cable 22 from loosening or shifting during use. Meanwhile, the connecting part 222 is embedded in the spacing 141 between the squeezing bosses 14 and is squeezed, so that sealing protection of the key connection area is achieved. The squeezing in the present invention means that a height of the wire pressing groove 13 is less than a thickness of the wire 221, and/or a width of the spacing between the squeezing bosses 14 is less than a thickness of the connecting part 222, so that the flat cable 22 may be squeezed when positioned on the wire pressing groove 13 and the squeezing boss 14 to achieve an interference fit. Since a surface of the flat cable 22 is made of a flexible material, the wires 221 at two sides of the connection between the flat cable 22 and the shell 10 are squeezed by the interference fit connection, so that a cross-sectional area of the flat cable 22 at two ends is larger than a cross-sectional area of the wire pressing groove 13, thereby achieving sealing.

Therefore, this structure not only simplifies the mounting process of the flat cable 22, improves assembly efficiency and precision, and avoids the hidden dangers of structural loosening or water ingress caused by manual misalignment, but also improves the overall structural stability and waterproof performance of the eaves lamp, thereby effectively extending the service life of the eaves lamp during outdoor use.

Further, as shown in FIGS. 1 to 5, in an embodiment, to improve the sealing and stability of the wire pressing structure, the spacing 141 between the squeezing bosses 14 is preferably set to be 0.01-0.1 mm less than a thickness of the connecting part 222 of the flat cable 22. When the upper shell 11 and the lower shell 12 are closed, the squeezing boss 14 applies a slight compression to the connecting part 222 of the flat cable 22, thereby enhancing the sealing effect and the mechanical fixing capability. This design of the spacing 141 may not only avoid damage to the flat cable 22, but also ensure that the flat cable 22 does not leak or shift due to loosening during long-term outdoor use, which helps to improve the overall waterproof performance and reliability of the eaves lamp.

Further, as shown in FIGS. 1 to 5, in an embodiment, to further ensure the firm clamping of the wires 221, a maximum spacing between inner walls of the wire pressing grooves 13 (i.e., a maximum spacing between the wire pressing grooves 13 of the upper shell 11 and the lower shell 12) is preferably 0.01-0.1 mm less than a thickness of the wire 221 in this embodiment. This design causes the wire 221 to be slightly compressed and deformed during assembly, thereby forming a stable interference fit and preventing the wire 221 from shaking or falling off during transportation, mounting or use. Meanwhile, an appropriate interference amount does not damage an insulation layer of the wire 221, which is beneficial to enhancing the sealing effect between the wire 221 and the shell 10 and improving assembly consistency.

Further, as shown in FIGS. 1 to 5, in an embodiment, the surfaces of the squeezing bosses 14 of the upper shell 11 and the lower shell 12 facing each other may be designed as planes. The plane structure provides a uniform pressing force and is suitable for the connecting part 222 of the flat cable 22 with uniform thickness.

In another embodiment, the surfaces of the squeezing bosses 14 of the upper shell 11 and the lower shell 12 facing each other may be designed as convex arc surface structures. The convex arc surface structures may provide a more flexible adaptive capacity during the pressing process, adapt to the connecting part 222 with a slight thickness error, and reduce the point-like stress concentration area, thereby avoiding the damage to the flat cable 22 caused by an excessive assembly pressure.

Further, as shown in FIGS. 1 to 5, in an embodiment, to facilitate the routing of the flat cable 22 and enhance the structural strength, a mounting seat 15 protruding outward from an outer wall of the shell 10 is provided on an outer side of the shell 10, and the wire pressing groove 13 is arranged through the mounting seat 15. The mounting seat 15 serves as a wiring channel for the pressing wires, which not only plays a role in protecting and fixing the flat cable 22, but also provides a mounting base for subsequent serial expansion. Meanwhile, the protruding structure is conducive to the formation of a complete channel for the wire pressing groove 13, and automatically achieves the cable positioning when the shell 10 is closed, thereby improving assembly efficiency and reliability.

Further, as shown in FIGS. 1 to 5, in an embodiment, to more precisely arrange the connection structure of the wires 221, an upwardly protruding mounting boss 151 is provided on the mounting seat 15 of the lower shell 12, and the wire pressing groove 13 is arranged through the mounting boss. It may be understood that the mounting boss 151 is arranged at one side of the mounting seat 15 of the lower shell 12 facing the upper shell 11, the wire pressing groove 13 passes through the mounting boss 151, and a limiting groove 152 adapted to the mounting boss 151 is provided on the upper shell 11. The mounting boss 151 is engaged with the limiting groove 152, which helps to guide the reasonable routing of the flat cable 22 and limit the moving space of the flat cable, thereby improving the accuracy of assembly positioning and the sealing effect of the crimping area, and reducing manual alignment errors.

It should be noted that the wire pressing groove 13 of the upper shell 11 is formed on the bottom wall of the limiting groove 152, and the wire pressing groove 13 of the lower shell 12 is formed on the mounting boss 151 and is aligned with the wire pressing groove 13 of the upper shell 11.

Further, as shown in FIGS. 1 to 5, in an embodiment, two sets of mounting seats 15 are preferably provided, which are symmetrically arranged at two opposite sides of the shell 10, respectively, so that the eaves lamp has higher versatility and expandability. The user may mount a plurality of lamps in series through the mounting set 15 based on a requirement, which is suitable for eaves with different lengths or complex wiring scenarios. Meanwhile, two sets of mounting seats 15 may form a stable fixed structure, which enhances the overall structural strength, and avoids sagging or deformation during long-distance mounting.

Further, as shown in FIGS. 1 to 5, in an embodiment, to ensure rapid positioning and firm assembly between the upper shell 11 and the lower shell 12 during assembly, a close-fit column 161 is arranged on the mounting seat 15 of the lower shell 12, a positioning groove 162 cooperating with the close-fit column is provided on the mounting seat 15 of the upper shell 11, and the close-fit column 161 is arranged at a side edge of the mounting boss 151. With this structure, the user may quickly complete the alignment when closing the shell, and the cooperation between the close-fit column 161 and the groove may prevent lateral sliding, improve assembly consistency, and reduce the possibility of manual misassembly.

In another embodiment, the positioning groove 162 may also be configured as a positioning hole.

Further, the close-fit column 161 preferably adopts a tapered design, which is gradually tapered from a bottom to a top, and the positioning groove 162 is designed to form an interference fit structure with a bottom of the close-fit column 161. During the assembly process, the tapered close-fit column 161 may be first introduced into the positioning groove 162 to achieve the self-guiding function. Meanwhile, due to the interference fit at the bottom, sufficient clamping force may be generated after cooperation between the close-fit column and the positioning groove to prevent loosening, thereby improving assembly accuracy and shock resistance.

Further, as shown in FIGS. 1 to 5, in an embodiment, to improve the sealing effect and the assembly firmness of the shell 10, the upper shell 11 and the lower shell 12 are preferably sealed and fixed by ultrasonic welding. To further improve welding strength and efficiency, welding lines are provided at the connection between the lower shell 12 and the upper shell 11, including a first welding line 171 that is attached to an outer wall of the accommodating cavity, a second welding line 172 arranged on a side edge of the mounting boss 151, and a third welding line 173 arranged on a side edge of the wire pressing groove 13. The triple welding area ensures multi-point reinforcement of the overall structure, thereby enhancing waterproof performance and resistance to deformation.

Further, as shown in FIGS. 1 to 5, in an embodiment, to enhance the illumination effect of lamp beads and improve the visual focusing effect, the upper shell 11 is provided with a light-focusing area 111 at a position corresponding to the lamp beads, and the upper shell is integrally injection-molded from a highly transparent material. In the mold design, the cavity of the light-focusing area 111 is polished to reduce light scattering and enhance focusing capability. The light-focusing area 111 may preferably be an outwardly convex hemispherical structure, which effectively concentrates the light emitted by the lamp beads, improves the brightness and directionality of the illumination, and is suitable for landscape lighting or key lighting areas.

Further, as shown in FIGS. 1 to 5, in an embodiment, since the upper shell 11 is made of a transparent material and the light board 21 is mounted in the accommodating cavity 18, the user easily sees the entire light board 21, which further affects the visual appearance of the product. To improve the visual appearance of the product, in this embodiment, a shielding area 112 is provided in an area of the upper shell 11 that avoids an illumination path of the lamp beads. The shielding area 112 is arranged on an inner wall of the upper shell 11 and is mainly used to block part of the area in a non-lighting direction. The shielding area is arranged in cooperation with the layout of the light board 21, so that the user may only see the main design structure of the eaves lamp, which effectively improves the overall appearance of the eaves lamp and enhances the visual appeal of the eaves lamp.

The shielding area 112 may be provided with a decorative sheet, or may be provided with a frosted texture to reduce the transparency of the shielding area 112, and no specific limitation is made herein.

Figure 6:
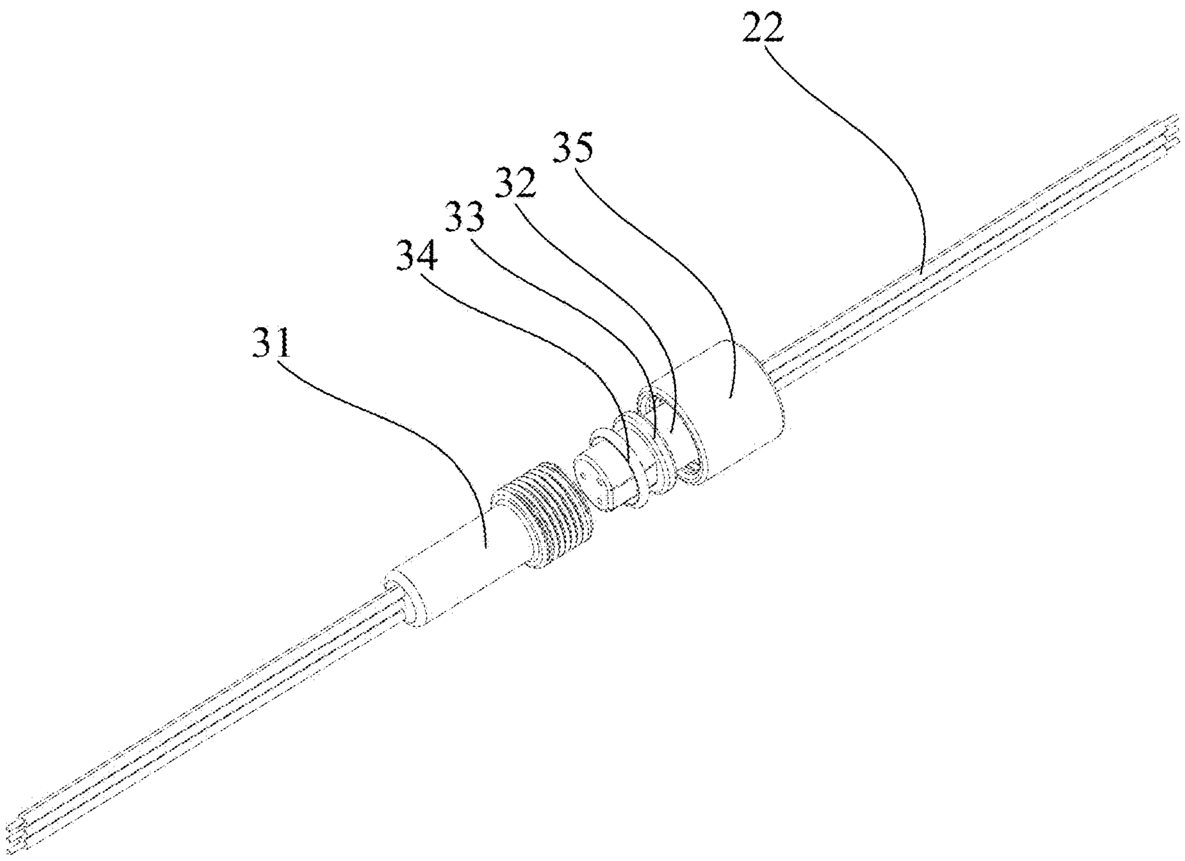
FIG. 6 is a schematic diagram of an exploded structure of a male connector and a female connector at an angle.

Further, as shown in FIG. 1 and FIG. 6, in an embodiment, to meet the flexibility requirements of the connection method of the eaves lamps in complex mounting environments, at least two eaves lamps may be provided. A male connector 31 is provided on the flat cable 22 of one eaves lamp, and a female connector 32 is provided on the flat cable of another eaves lamp, which are used for series connection of a plurality of lamps. One end of the female connector 32 is provided with a screw cap 35 with an internal thread, and a front end of the male connector 31 is provided with an external thread. The connection between the male connector and the female connector 32 is completed by tightening the screw cap 35 to ensure a stable and waterproof connection. An annular abutment ring 33 is provided outside the female connector 32, the screw cap 35 is sleeved outside the annular abutment ring and abuts against the connecting area, and a sealing ring 34 is additionally provided between the abutment ring 33 and the male connector 31, so that the waterproof performance and the aging resistance of the connecting position are further enhanced.

It may be understood that an eaves lamp is provided with two flat cables 22, one end of one of the flat cables 22 is provided with a male connector 31, and one end of the other cable 22 is provided with a female connector 32. Therefore, when the eaves lamp is adapted to a larger mounting environment, a plurality of eaves lamps may be selected based on a user requirement to be connected in series to increase the mounting range of the eaves lamps, and two adjacent eaves lamps may be electrically connected by the male connector 31 and the female connector 32.

In another embodiment of the present invention, the present invention further provides a manufacturing method of the eaves lamp. Specifically, to manufacture an eaves lamp with good waterproof performance and optical focusing effect, the following steps are specifically adopted to complete the assembly and processing. The manufacturing method of the eaves lamp is as follows:

S1: A mold cavity of the upper shell and a mold cavity of the lower shell are separately designed, wherein a portion of the mold cavity corresponding to the light-focusing area 111 is precisely machined and mirror-polished.

In the step S1, the injection molds of the upper shell 11 and the lower shell 12 are designed according to the functional requirements and structural features of the lamp. The mold of the upper shell 11 is provided with a dedicated cavity at the position corresponding to the light-focusing area 111. The cavity area is processed and formed by high-precision CNC (computer numerical control) equipment and mirror-polished, so that the surface of the final injection-molded light-focusing area 111 is smooth and transparent, which can effectively enhance the light focusing capability. Meanwhile, the mold of the lower shell 12 is correspondingly provided with a structural area of the close-fit column 161, so that the subsequent fastening and positioning functions are ensured. The corresponding squeezing bosses 14 and the wire pressing grooves 13 are configured to meet the requirements of squeezing and interference connection on the flat cable 22 in the foregoing embodiments.

S2: A molding material is injected into the mold cavities to obtain the upper shell and the lower shell.

Specifically, PC (polycarbonate) or PMMA (poly(methyl methacrylate)) material with excellent light transmittance is injected into the mold of the upper shell 11 to obtain an integrally formed upper shell 11 with a convex light-focusing structure; PP (polypropylene) or ABS (acrylonitrile butadiene styrene) material with good weather resistance is injected into the mold of the lower shell 12 to form the lower shell 12 with a close-fit column 161. The two parts are molded in one step through hot runner injection molding to ensure shape precision and dimensional stability.

S3: The light-emitting assembly is mounted on the lower shell, and the lower shell and the upper shell are secured relative to each other through cooperation between the close-fit column and the positioning groove.

Specifically, the light board 21 and the flat cable 22 of the light-emitting assembly are pre-welded, the light board 21 of the light-emitting assembly is mounted in the accommodating cavity 18, and the flat cable 22 is correspondingly mounted on a wire passing groove and the squeezing boss 14, which ensures that the light sources of the lamp beads are aligned with the light-focusing area 111 of the upper shell 11. Then, the upper shell 11 is aligned with the lower shell 12, and the alignment and positioning are completed by inserting the close-fit column 161 into the positioning groove 162 of the upper shell 11. Since the positioning groove 162 and the close-fit column 161 adopt a slight interference fit, the upper shell 11 and the lower shell 12 have a preliminary fixing and sealing effect before welding, which is helpful for subsequent operations.

S4: Ultrasonic welding is performed on the upper shell and the lower shell to obtain the eaves lamp.

The upper shell 11 and the lower shell 12 after alignment are placed in an ultrasonic welding device, and ultrasonic vibration welding is performed on the first welding line 171 (attached to an outer wall of the accommodating cavity), the second welding line 172 (positioned on a side edge of the mounting boss 151) and the third welding line 173 (arranged on a side edge of the wire passing groove) configured in the ultrasonic welding device, so that the two shells 10 are uniformly combined on a plurality of welding surfaces. After welding is completed, the overall structure of the eaves lamp is firm and well-sealed, which may effectively prevent the intrusion of rain and dust and meet the requirements of long-term outdoor use.

This embodiment combines structured assembly steps with precision manufacturing technology, so that the eaves lamp has good protection capabilities and optical performance, while improving assembly efficiency and finished product consistency during mass production.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

The invention claimed is:

1. An eaves lamp, comprising:

a shell, wherein the shell comprises an upper shell and a lower shell closed to form an accommodating cavity, at least two wire pressing grooves are arranged on the upper shell and the lower shell, a squeezing boss is formed between adjacent wire pressing grooves, and a spacing is defined between a squeezing boss of the upper shell and a squeezing boss of the lower shell;

a light-emitting assembly, wherein the light-emitting assembly comprises a light board and a flat cable electrically connected to the light board, the light board is arranged in the accommodating cavity, the flat cable comprises at least two wires connected in parallel, a connecting part is arranged between the two wires, the wires pass through the wire pressing grooves, and the connecting part is positioned in the spacing; when the upper shell and the lower shell are closed, the wire pressing grooves and the squeezing boss squeeze the flat cable, the flat cable is in interference fit with the shell, and a cross-sectional area of the flat cable at two ends of a squeezed position is larger than a cross-sectional area of the wire pressing grooves, thereby sealing the wire pressing grooves;

wherein the shell is provided with a mounting seat protruding therefrom, and the wire pressing groove is arranged through the mounting seat;

wherein the mounting seat of the lower shell is provided with a mounting boss, the mounting seat of the upper shell is provided with a limiting groove adapted to the mounting boss, the wire pressing groove of the lower shell is arranged through the mounting boss, and the wire pressing groove of the upper shell is arranged on a bottom wall of the limiting groove.

2. The eaves lamp according to claim 1, wherein the spacing between the squeezing boss of the upper shell and the squeezing boss of the lower shell is 0.01-0.1 mm less than a thickness of the connecting part.

3. The eaves lamp according to claim 2, wherein a maximum spacing between the wire pressing groove of the upper shell and the wire pressing groove of the lower shell is 0.01-0.1 mm less than a thickness of the wire.

4. The eaves lamp according to claim 2, wherein surfaces of the squeezing boss of the upper shell and the squeezing boss of the lower shell facing each other are planes.

5. The eaves lamp according to claim 2, wherein surfaces of the squeezing boss of the upper shell and the squeezing boss of the lower shell facing each other are convex arc surfaces.

6. The eaves lamp according to claim 1, wherein two sets of mounting seats are provided, and the two sets of mounting seats are arranged at opposite sides of the shell.

7. The eaves lamp according to claim 1, wherein the mounting seat of the lower shell is provided with a close-fit column, the mounting seat of the upper shell is provided with a positioning groove cooperating with the close-fit column, and the close-fit column is arranged at a side edge of the mounting boss.

8. The eaves lamp according to claim 7, wherein the close-fit column is gradually tapered from a bottom toward a top, and the positioning groove is in interference fit with the bottom of the close-fit column.

9. The eaves lamp according to claim 8, wherein the upper shell and the lower shell are sealed and fixed using ultrasonic welding.

10. The eaves lamp according to claim 9, wherein a welding line is provided at a connection between the lower shell and the upper shell, and the welding line comprises a first welding line provided to attach to an outer wall of the accommodating cavity, a second welding line provided on a side edge of the mounting boss, and a third welding line provided on a side edge of the wire pressing groove.

11. The eaves lamp according to claim 1, wherein the upper shell is formed with a light-focusing area at a position corresponding to a lamp bead of the light board, and the upper shell is made of a transparent material.

12. The eaves lamp according to claim 11, wherein the upper shell is integrally injection-molded, and a portion of a mold cavity corresponding to the light-focusing area is polished.

13. The eaves lamp according to claim 12, wherein the light-focusing area is an outwardly convex hemispherical structure.

14. The eaves lamp according to claim 12, wherein an inner wall of the upper shell is provided with a shielding area at a position corresponding to the light board, and the shielding area is arranged to avoid the lamp bead of the light board.

15. The eaves lamp according to claim 8, wherein at least two eaves lamps are provided, two adjacent eaves lamps are interconnected by the flat cable, a male connector is provided on the flat cable of one of the eaves lamps, and a female connector is provided on the flat cable of the other eaves lamp.

16. The eaves lamp according to claim 15, wherein a screw cap is provided at one end of the female connector, an internal thread is provided on the screw cap, an external thread is provided at a front end of the male connector, and the male connector is in threaded connection with the female connector.

17. The eaves lamp according to claim 16, wherein the female connector is provided with an abutment ring, the screw cap is sleeved on the abutment ring, and a sealing ring is arranged between the male connector and the abutment ring.

18. A manufacturing method of the eaves lamp according to claim 10, wherein the upper shell is provided with a light-focusing area protruding outward, the lower shell is provided with a close-fit column, and the upper shell is provided with a positioning groove;

the manufacturing method comprises the following steps:

S1: separately designing a mold cavity of the upper shell and a mold cavity of the lower shell, wherein a portion of the mold cavity corresponding to the light-focusing area is precisely machined and mirror-polished;

S2: injecting a molding material into the mold cavities to obtain the upper shell and the lower shell;

S3: mounting the light-emitting assembly on the lower shell, and securing the lower shell and the upper shell relative to each other through cooperation between the close-fit column and the positioning groove; and S4: performing ultrasonic welding on the upper shell and the lower shell to obtain the eaves lamp.

19. An eaves lamp, comprising:

a shell, wherein the shell comprises an upper shell and a lower shell closed to form an accommodating cavity, at least two wire pressing grooves are arranged on the upper shell and the lower shell, a squeezing boss is formed between adjacent wire pressing grooves, and a spacing is defined between a squeezing boss of the upper shell and a squeezing boss of the lower shell;

a light-emitting assembly, wherein the light-emitting assembly comprises a light board and a flat cable electrically connected to the light board, the light board is arranged in the accommodating cavity, the flat cable comprises at least two wires connected in parallel, a connecting part is arranged between the two wires, the wires pass through the wire pressing grooves, and the connecting part is positioned in the spacing; when the upper shell and the lower shell are closed, the wire pressing grooves and the squeezing boss squeeze the flat cable, the flat cable is in interference fit with the shell, and a cross-sectional area of the flat cable at two ends of a squeezed position is larger than a cross-sectional area of the wire pressing grooves, thereby sealing the wire pressing grooves;

wherein the upper shell is formed with a light-focusing area at a position corresponding to a lamp bead of the light board, and the upper shell is made of a transparent material;

wherein the upper shell is integrally injection-molded, and a portion of a mold cavity corresponding to the light-focusing area is polished.

* * * * *